US 6,556,431 B1

(12) United States Patent
Ozias et al.

(10) Patent No.: US 6,556,431 B1
(45) Date of Patent: Apr. 29, 2003

(54) SYSTEM AND METHOD FOR CONVERTING ALTERNATING CURRENT INTO DIRECT CURRENT

(75) Inventors: Orin M. Ozias, Cedar Park, TX (US); Thomas L. Bentley, Austin, TX (US)

(73) Assignee: Dell USA, L.P., Round Rock, TN (US)

( * ) Notice: Subject to any disclaimer, the term of this patent is extended or adjusted under 35 U.S.C. 154(b) by 0 days.

(21) Appl. No.: 09/413,560

(22) Filed: Oct. 6, 1999

(51) Int. Cl.[7] .............................................. H05K 5/00
(52) U.S. Cl. ....................... 361/681; 361/736; 248/118; 395/575
(58) Field of Search ................. 361/683, 684, 361/686, 736, 681; 29/592, 401.1; 324/372–373; 248/118; 395/227, 575, 652; 714/23

(56) References Cited

U.S. PATENT DOCUMENTS

| 4,253,178 A | 2/1981 | Kolaczia ................. 368/285 |
| 4,438,458 A | 3/1984 | Munscher ................ 348/883 |
| 4,627,060 A | 12/1986 | Huang et al. ............. 371/62 |
| 4,788,658 A | 11/1988 | Hanebuth ................ 364/900 |
| 4,809,280 A | 2/1989 | Shonaka ................. 371/62 |
| 4,964,077 A | 10/1990 | Eisen et al. ............. 364/900 |
| 5,010,551 A | 4/1991 | Goldsmith et al. ........ 371/16.4 |
| 5,017,030 A | 5/1991 | Crews ................... 400/485 |
| 5,060,135 A | 10/1991 | Levine et al. ............ 364/200 |
| 5,196,993 A | 3/1993 | Herron et al. ............ 361/681 |
| 5,214,695 A | 5/1993 | Arnold et al. ............ 380/4 |
| 5,224,024 A | 6/1993 | Tu et al. ................ 361/831 |
| 5,228,655 A | 7/1993 | Garcia et al. ............ 248/118 |
| 5,276,805 A | 1/1994 | Hamaguchi .............. 395/164 |
| 5,287,505 A | 2/1994 | Calvert et al. ........... 395/600 |
| 5,325,521 A | 6/1994 | Koyama et al. ........... 375/575 |
| 5,346,410 A * | 9/1994 | Moore, Jr. .............. 439/607 |
| 5,348,408 A | 9/1994 | Gelardi et al. ........... 400/715 |
| 5,353,240 A | 10/1994 | Mallory et al. ........... 364/552 |
| 5,355,357 A | 10/1994 | Yamamori et al. ......... 369/75.2 |
| 5,356,099 A | 10/1994 | Sereboff ................ 248/118.1 |
| 5,367,667 A | 11/1994 | Wahlquist et al. ......... 395/575 |
| 5,374,018 A | 12/1994 | Daneshvar .............. 248/118 |
| 5,375,800 A | 12/1994 | Wilcox et al. ........... 248/118 |

(List continued on next page.)

FOREIGN PATENT DOCUMENTS

| GB | 2065939 | 7/1981 | ........... G06F/11/30 |
| GB | 2329266 | 3/1999 | ........... G06F/11/00 |
| GB | 2356271 | 5/2001 | ........... G06F/11/00 |
| WO | WO 93/00628 | 1/1993 | ............ G06F/1/24 |
| WO | WO 94/08289 | 4/1994 | ........... G06F/9/445 |
| WO | WO 97/09676 | 3/1997 | |
| WO | WO 98/18086 | 4/1998 | ........... G06F/17/30 |

OTHER PUBLICATIONS

CNET.com, "IBM to Get Colorful with New Notebooks" at Internet >http://news.cnet.com/news/0–1003–200–296049.html?tag=st.cn.1fd2.<, printed Oct. 6, 1999.
3Com, "Palm Computer, News and Promotions" at Internet >http://palm.com/pr/holidaydebut.html<, printed Oct. 5, 1999.

(List continued on next page.)

Primary Examiner—Darren Schuberg
Assistant Examiner—Hung Van Duong
(74) Attorney, Agent, or Firm—Baker Botts L.L.P.

(57) ABSTRACT

A system and method for converting alternating current into direct current are disclosed. The system and method allow an electronic device to employ an AC adapter while limiting the sacrificing of valuable component space and minimizing the risk of component harm resulting from the AC adapter's operation. A system incorporating teachings of the present disclosure may include an electronic device containing at least one electronic component designed to operate on direct current. The system may also include a stand coupled to the electronic device and supporting the electronic device in a viewable orientation. Within the stand may be located an alternating current adapter that is conductively coupled to the at least one electronic component.

20 Claims, 1 Drawing Sheet

U.S. PATENT DOCUMENTS

| | | | | |
|---|---|---|---|---|
| 5,381,526 | A | 1/1995 | Ellson | 395/164 |
| 5,388,032 | A | 2/1995 | Gill et al. | 364/146 |
| 5,390,324 | A | 2/1995 | Burckhartt et al. | 395/575 |
| 5,392,095 | A | 2/1995 | Siegel | 355/200 |
| 5,398,333 | A | 3/1995 | Schieve et al. | 395/575 |
| 5,410,447 | A | 4/1995 | Miyagawa et al. | 361/681 |
| 5,422,751 | A | 6/1995 | Lewis et al. | 349/59 |
| 5,423,605 | A | 6/1995 | Liu | 312/265.6 |
| 5,432,927 | A | 7/1995 | Grote et al. | 395/575 |
| 5,443,237 | A | 8/1995 | Stadtmauer | 248/441.1 |
| 5,454,080 | A | 9/1995 | Fasig et al. | 710/302 |
| 5,455,933 | A | 10/1995 | Schieve et al. | 395/183.03 |
| 5,471,674 | A | 11/1995 | Stewart et al. | 395/650 |
| 5,483,437 | A | 1/1996 | Tang | 363/146 |
| 5,503,484 | A | 4/1996 | Louis | 400/489 |
| 5,513,319 | A | 4/1996 | Finch et al. | 395/185.08 |
| 5,522,572 | A | 6/1996 | Copeland et al. | 248/118 |
| 5,526,180 | A | 6/1996 | Rausnitz | 359/609 |
| 5,530,847 | A | 6/1996 | Schieve et al. | 395/183.14 |
| 5,537,585 | A | 7/1996 | Blickenstaff et al. | 395/600 |
| 5,537,618 | A | 7/1996 | Boulton et al. | 395/161 |
| 5,547,154 | A | 8/1996 | Kirchoff et al. | 248/118.3 |
| 5,564,054 | A | 10/1996 | Bramnick et al. | 395/700 |
| 5,592,362 | A | 1/1997 | Ohgami et al. | 361/686 |
| 5,596,481 | A | 1/1997 | Liu et al. | 361/683 |
| 5,596,482 | A | 1/1997 | Horikoshi | 361/683 |
| 5,627,964 | A | 5/1997 | Reynolds et al. | 395/183.22 |
| 5,649,200 | A | 7/1997 | Leblang et al. | 717/122 |
| 5,668,992 | A | 9/1997 | Hammer et al. | 395/651 |
| 5,678,002 | A | 10/1997 | Fawcett et al. | 395/183.01 |
| 5,680,640 | A | 10/1997 | Ofek et al. | 395/839 |
| 5,689,706 | A | 11/1997 | Rao et al. | 395/617 |
| 5,694,293 | A | 12/1997 | Seto et al. | 361/687 |
| 5,708,812 | A | 1/1998 | Van Dyke et al. | 395/712 |
| 5,724,224 | A | 3/1998 | Howell et al. | 361/680 |
| 5,727,163 | A | 3/1998 | Bezos | 395/227 |
| 5,732,268 | A | 3/1998 | Bizzarri | 395/652 |
| 5,748,877 | A | 5/1998 | Dollahite et al. | 395/183.12 |
| 5,768,370 | A | 6/1998 | Maatta et al. | 379/433.01 |
| 5,775,822 | A | 7/1998 | Cheng | 400/489 |
| 5,778,372 | A | 7/1998 | Cordell et al. | 707/100 |
| 5,790,796 | A | 8/1998 | Sadowsky | 709/219 |
| 5,796,579 | A | 8/1998 | Nakajima et al. | 361/683 |
| 5,797,281 | A | 8/1998 | Fox | 63/12 |
| 5,803,416 | A | 9/1998 | Hanson et al. | 248/118 |
| 5,805,882 | A | 9/1998 | Cooper et al. | 713/2 |
| 5,809,248 | A | 9/1998 | Vidovic | 709/219 |
| 5,809,511 | A | 9/1998 | Peake | 707/204 |
| 5,818,635 | A | 10/1998 | Hohn et al. | 359/612 |
| 5,819,274 | A | 10/1998 | Jackson, Jr. | 707/10 |
| 5,825,355 | A | 10/1998 | Palmer et al. | 345/336 |
| 5,825,506 | A | 10/1998 | Bednar et al. | 358/402 |
| 5,826,839 | A | 10/1998 | Chen | 248/118 |
| 5,832,522 | A | 11/1998 | Blickenstaff et al. | 707/204 |
| 5,835,344 | A | 11/1998 | Alexander | 361/683 |
| 5,854,828 | A | 12/1998 | Kocis et al. | 379/52 |
| 5,860,001 | A | 1/1999 | Cromer et al. | 395/1 |
| 5,860,002 | A | 1/1999 | Huang | 713/2 |
| 5,860,012 | A | 1/1999 | Luu | 717/178 |
| 5,861,884 | A | 1/1999 | Fujioka | 345/338 |
| 5,881,236 | A | 3/1999 | Dickey | 709/201 |
| 5,884,073 | A | 3/1999 | Dent | 713/652 |
| 5,894,571 | A | 4/1999 | O'Connor | 395/652 |
| 5,904,327 | A | 5/1999 | Cheng | 248/118.1 |
| 5,905,632 | A | 5/1999 | Seto et al. | 361/683 |
| 5,906,506 | A | 5/1999 | Chang et al. | 439/500 |
| 5,909,544 | A | 6/1999 | Anderson, II et al. | 709/208 |
| 5,939,694 | A | 8/1999 | Holcomb et al. | 235/381 |
| 5,953,533 | A | 9/1999 | Fink et al. | 717/175 |
| 5,955,797 | A * | 9/1999 | Kim | 307/150 |
| 5,960,204 | A | 9/1999 | Yinger et al. | 717/176 |
| 5,960,411 | A | 9/1999 | Hartman et al. | 705/26 |
| 5,963,743 | A | 10/1999 | Amberg et al. | 717/174 |
| 5,974,546 | A | 10/1999 | Anderson | 713/2 |
| 5,978,911 | A | 11/1999 | Knox et al. | 713/1 |
| 5,991,543 | A | 11/1999 | Amberg et al. | 717/178 |
| 5,995,757 | A | 11/1999 | Amberg et al. | 717/175 |
| 6,012,154 | A | 1/2000 | Poisner | 714/55 |
| 6,014,744 | A | 1/2000 | McKaughan et al. | 713/2 |
| 6,032,157 | A | 2/2000 | Tamano et al. | 707/104 |
| 6,034,869 | A | 3/2000 | Lin | 361/686 |
| 6,038,597 | A | 3/2000 | Van Wyngarden | 709/219 |
| 6,047,261 | A | 4/2000 | Siefert | 705/11 |
| 6,048,454 | A | 4/2000 | Howell et al. | 210/172 |
| 6,049,342 | A | 4/2000 | Nielson et al. | 345/473 |
| 6,050,833 | A | 4/2000 | Danzyger et al. | 439/92 |
| 6,061,788 | A | 5/2000 | Reynaud et al. | 713/2 |
| 6,061,810 | A | 5/2000 | Potter | 714/23 |
| 6,104,874 | A | 8/2000 | Branson et al. | 395/702 |
| 6,108,697 | A | 8/2000 | Raymond et al. | 709/218 |
| 6,112,320 | A | 8/2000 | Dien | 714/51 |
| 6,113,050 | A | 9/2000 | Rush | 248/346.01 |
| 6,166,729 | A | 12/2000 | Acosta et al. | 345/327 |
| 6,167,383 | A | 12/2000 | Henson | 705/26 |
| 6,167,532 | A | 12/2000 | Wisecup | 714/23 |
| 6,182,212 | B1 | 1/2001 | Atkins et al. | 713/1 |
| 6,182,275 | B1 | 1/2001 | Beelitz et al. | 717/1 |
| 6,199,204 | B1 | 3/2001 | Donohue | 717/11 |
| 6,202,207 | B1 | 3/2001 | Donohue | 717/11 |
| 6,226,412 | B1 | 5/2001 | Schwab | 382/232 |
| 6,236,901 | B1 | 5/2001 | Goss | 700/95 |
| 6,247,126 | B1 | 6/2001 | Beelitz et al. | 713/1 |
| 6,256,620 | B1 | 7/2001 | Jawahar et al. | 707/2 |
| 6,263,215 | B1 * | 7/2001 | Patton et al. | 455/561 |
| 6,272,484 | B1 | 8/2001 | Martin et al. | 707/1 |
| 6,279,109 | B1 | 8/2001 | Brundridge | 713/2 |
| 6,279,156 | B1 | 8/2001 | Amberg et al. | 717/11 |
| 6,298,443 | B1 | 10/2001 | Colligan et al. | 713/200 |
| 6,331,936 | B1 * | 12/2001 | Hom et al. | 361/686 |
| 6,356,977 | B2 | 3/2002 | Ofek et al. | 711/112 |
| 6,393,586 | B1 | 5/2002 | Sloan et al. | 714/25 |
| 6,449,735 | B1 | 9/2002 | Edwards et al. | 714/25 |

OTHER PUBLICATIONS

Exploring Windows NT "ZD Journals" at Internet >http://www.zdjournals.com/9802.ewn9821.html<, printed Oct. 18, 1999.

PCWorld News "Compaq Debuts Home PCs" at Internet >http://www2.pcworld.com.html<, printed Oct. 18, 1999.

"HP builds in Net button," at Internet <http://news.cnet.com/news/0–1003–202–316545.html>, printed Oct. 18, 1999.

"Packard Bell PCs provide state–of–the–art technology and complete user support" at <http://www.gadgetguru.com.html>, printed Oct. 18, 1999.

@Backup Company, "@Backup Company Information Page" at Internet, http://security.atbackup.com/VID101.3.816255.0/Company.htm, Printed Jun. 15, 1999.

@Backup Company, "@Backup Company Frequently Asked Questions" at Internet, http://security.atbackup.com/VID101.3.819255.0/FAQ.asp, Printed Jun. 15, 1999.

@Backup Company, "Frequently Asked Questions: Technical" at Internet, http://security.atbackup.com/VID101.3.819255.0/Tech.asp, Printed Jun. 15, 1999.

@Backup Company, "Are You Protected" at Internet, http://security.atbackup.com/VID101.3.819255.0/Main.asp, Printed Jun. 15, 1999.

Compaq Computer Corporation, Press Release, "New PCs Offer Equipment, Colour and Personality; Compaq's Presario Range Opened Up for Customisation" at Internet>http://biz.yahoo.com/prnews/000719/compaq_new.html<, printed Jul. 24, 2000.

Compaq Computer Corporation, "Home and Home Office Computing, My Style" at internet >wysiwyg://3http://athome.compaq.com/showroom/static/splash.asp<, printed Jul. 18, 2000.

Epson, "Epson Stylus Color 74i It makes a Colorful Case for Being Your iMac Printer" at Internet >http://www.epson.com/printer/inkjet/sty740i.html<, printed Jul. 24, 2000.

Radio Shack, advertisement, p. 2, Aug. 20, 2000.

Great Britain Search and Examination Report 0019866.3, Mar. 12, 2001.

Pending Patent Application Ser. No. 09/236,862: Alan E. Beelitz, Richard D. Amberg; "Recoverable Software Installation Process and Apparatus for a Computer System"; Dell USA, L.P., Filed Jan. 25, 1999.

Pending Patent Application 09/245,148: Jeffrey N. Sloan, Tim Sullivan, David S. Springer, *"Method and Apparatus for Diagnosing and Conveying an Identification Code in Post on a Non–Booting Personal Computer"*; Dell USA, L.P., Filed Feb. 4, 1999.

Wilson et al. "Knowledge based interface to manufacturing computer system", ACM pp. 1183–1189.

Green, "Component based software development: implications for documentation", ACM pp. 159–164.

Hall et al., "A cooperative approach to support software deployment using software dock" ACM ICSE pp. 174–183.

* cited by examiner

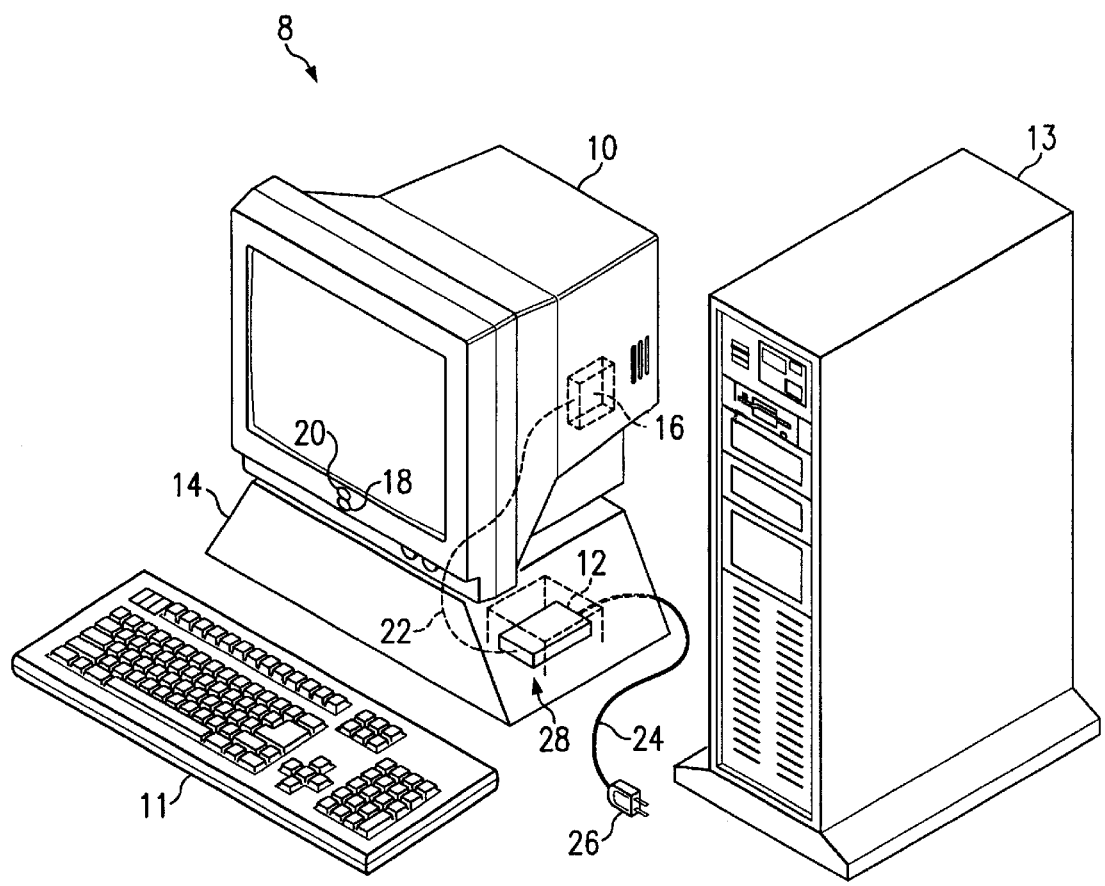

SYSTEM AND METHOD FOR CONVERTING ALTERNATING CURRENT INTO DIRECT CURRENT

TECHNICAL FIELD

The present disclosure relates in general to supplying power to an electronic device and, more particularly, to a system and method for converting alternating current into direct current in a computer system.

BACKGROUND

Many electronic devices (e.g., personal computers) designed to operate on direct current (DC current) seem to operate on the power supplied by a wall outlet. As a result, these devices appear to be operating on alternating current (AC current). In reality, these electronic devices are probably employing an alternating current (AC) adapter.

In operation, an AC adapter plugs into a standard electrical outlet (e.g., a wall outlet), pulls AC current from the outlet, and converts the AC current to DC current. Several AC adapters have additional functionality. For example, some AC adapters provide power to an electronic device while at the same time recharging any rechargeable batteries located within the electronic device. In addition, some AC adapters regulate the voltage supplied to an electronic device in an attempt to eliminate spikes and surges that may damage electronic equipment. Not all power supplies, however, do an adequate voltage-regulation job. As such, some sensitive electronic devices (e.g., personal computers) may remain susceptible to large voltage fluctuations despite the use of a voltage-regulating AC adapter.

Unfortunately, the primary function of AC adapters, converting AC current into DC current, and many of the secondary functions create both an electromagnetic field and heat. These two by-products are both potentially damaging to electronic devices.

To counteract these by-products, several conventional techniques have been developed. For example, with laptop computers, AC adapters are conventionally provided as external devices with two plugs, one that plugs into the wall and a second that plugs into the laptop. This technique generally forces laptop users to keep track of the external device. With desktop computers, AC adapter bricks tend to be located within the housing of the computing device. This technique ties up valuable space within the housing and usually necessitates extensive shielding to prevent the heat and electromagnetic fields created by the AC adapter's operation from harming other components located within the housing.

SUMMARY

In accordance with the present disclosure, a system and method for converting alternating current into direct current are disclosed that provide significant advantages over prior developed systems. The disclosed embodiments allow an electronic device, such as a computer, to employ an AC adapter while limiting the sacrificing of valuable component space and minimizing the risk of potential harm to the components of the device resulting from the AC adapter's operation.

According to one aspect of the present disclosure, a system incorporating teachings of the present disclosure may include an electronic device containing at least one electronic component designed to operate on direct current. The system may also include a stand coupled to the electronic device. In some embodiments, the stand may support the electronic device in a viewable orientation. Within the stand may be located an alternating current adapter that is conductively coupled to the at least one electronic component. In operation, this alternating current adapter may take alternating current supplied, for example, from a wall outlet and convert it into direct current that may be used by the at least one electronic component.

According to another aspect of the present disclosure, a method that incorporates teachings of the present disclosure may involve obtaining an electronic device, such as a computer system or computer monitor, that contains at least one electronic component designed to operate on direct current. To the electronic device may be attached a stand that is operable to support the electronic device. An alternating current adapter may be fixed within the stand. In some embodiments, the stand may be at least partially formed of extruded plastic. This extruded plastic portion may include an adapter slot in which the alternating current adapter may securely fit.

In addition to being fixed within the stand, the alternating current adapter may be conductively coupled to the at least one electronic component. As such, alternating current may be provided to the alternating current adapter, the provided alternating current may be converted into direct current, and the direct current may then be provided to the at least one electronic component.

The present disclosure provides several technical advantages. For example, by fixing an AC adapter within the stand of an electronic device, a user is not forced to keep track of the AC adapter.

In addition, the AC adapter does not tie up valuable space within the component enclosure of the electronic device's housing. As such, the AC adapter may be able to operate safely with a fraction of the extensive shielding usually necessary to prevent the AC adapter's operation from harming other components located within the housing.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawing, wherein:

FIG. 1 depicts a computer system including a monitor and alternating current adapter, each incorporating teachings of the present disclosure.

DETAILED DESCRIPTION

Preferred embodiments and their advantages are best understood by reference to FIG. 1.

FIG. 1 depicts a computer system 8 including monitor 10 and an alternating current adapter 12, each incorporating teachings of the present disclosure. Other components of the computer system may include, for example, keyboard 11, processor 13, printers and zip drives. As depicted in FIG. 1, monitor 10 sits atop a monitor stand 14 that supports monitor 10 in a viewable orientation. Within monitor 10 may be an electronic component 16 designed to operate on direct current. In addition to the monitor depicted in FIG. 1 (i.e., monitor 10), other types of monitors and electronic devices may incorporate teachings of the present disclosure. For example, in some embodiments, monitor 10 may be replaced with a flat panel display.

As depicted in FIG. 1, monitor stand 14 may be at least partially formed of extruded plastic. This extruded plastic portion may include an adapter slot (not expressly shown) in which alternating current adapter 12 may fit. In addition, monitor stand 14 may include an exit hole, representatively depicted at 18, and monitor 10 may include an access hole, representatively depicted at 20. Through these two holes may extend an internal connection cable 22 providing a pathway for direct current flowing from alternating current adapter 12 and to electronic component 16. Internal connection cable 22 may be connected to an output (not expressly shown) of alternating current adapter 12.

During operation of monitor 10 and electronic component 16, alternating current adapter 12 may be provided with alternating current via supply cord 24 and wall plug 26. Supply cord 24 may be connected to alternating current adapter 12 at a single input (not expressly shown). During operation, wall plug 26 may be plugged into a wall outlet and, as such, may supply alternating current from the wall outlet. In North America, standard household current is typically supplied as an alternating current (AC) of 110 volts. In other parts of the world, the current may be supplied at 220 volts.

While this type of power may be suitable for many types of devices, it is generally considered unsuitable for use within low-voltage devices (e.g., personal computers, laptop computers, flat panel displays, and computer monitors like monitor 10). Low-voltage devices usually require direct current (DC), the type of power generally associated with batteries.

After providing alternating current adapter 12 with alternating current, alternating current adapter 12 may convert the alternating current into direct current and provide the direct current to electronic component 16.

The process of converting supplied alternating current to direct current, however, may result in the production of heat and electromagnetic fields. As such, alternating current adapter 12 may have a shielding element 28 that at least partially surrounds alternating current adapter 12. Shielding element 28 may be operable to limit electromagnetic radiation. In addition, shielding element 28 may be operable to contain heat produced during the operation of alternating current adapter 12. Shielding element 28 may include any number of materials such as plastics, metals, and composites.

Although the present disclosure has been described in detail, it should be understood that various changes, substitutions and alterations can be made thereto without departing from the spirit and scope of the invention as defined by the appended claims.

What is claimed is:

1. A computer system, comprising:
   a monitor containing at least one electronic component designed to operate on direct current;
   a monitor stand coupled to the monitor and supporting the monitor in a viewable orientation, the monitor stand space apart from an associated computer system component, the computer system component including a processor; and
   an alternating current adapter located within the monitor stand, the alternating current adapter conductively coupled to the at least one electronic component.

2. The system of claim 1, wherein the monitor comprises a flat panel display.

3. The system of claim 1, wherein the alternating current adapter comprises:
   a single input for receiving alternating current; and
   a single output for providing direct current to the at least one electronic device.

4. The system of claim 1, further comprising a shielding element surrounding the alternating current adapter disposed within the monitor stand, the shielding element operable to limit electromagnetic radiation.

5. The system of claim 1, further comprising a metallic shielding element at least partially surrounding the alternating current adapter.

6. The system of claim 1, wherein the associated computer system component futher comprises:
   a processor communicatively coupled to the monitor; and
   a keyboard communicatively coupled to the processor.

7. The system of claim 1, wherein the monitor stand comprises extruded plastic and defines an adapter slot, and wherein the alternating current adapter is located within the adapter slot.

8. The system of claim 1, further comprising a connection cable conductively coupling the alternating current adapter to the at least one electronic device.

9. The system of claim 8, wherein the connection cable extends from an exit hole formed in the stand and into an access hole formed in a housing component of the monitor.

10. A method for converting alternating current into direct current for use in a computer system having a monitor containing at least one electronic component designed to operate on direct current, comprising the steps of:
    placing an alternating current adapter at a desired location within a monitor stand coupled to the monitor, the monitor stand spaced apart from an associated computer system component including a processor;
    conductively coupling the alternating current adapter to the at least one electronic component;
    supplying the alternating current adapter with alternating current; and
    converting the alternating current into direct current with the alternating current adapter, the direct current for use by the at least one electronic component.

11. The method of claim 10, wherein the supplying step comprises plugging the alternating current adapter into a wall outlet.

12. The method of claim 10, further comprising the step of regulating voltage supplied to the at least one electronic device with the alternating current device.

13. The method of claim 10, wherein the monitor comprises a flat panel display.

14. The method of claim 10, further comprising the steps of:
    forming an adapter slot within the monitor stand; and
    placing the alternating current adapter in the adapter slot.

15. The method of claim 10, further comprising the step of forming the monitor stand from extruded plastic.

16. A method for converting alternating current into direct current for an electronic device that contains at least one electronic component designed to operate on direct current, comprising the steps of:
    attaching a monitor stand to the electronic device, the stand operable to support the electronic device and the stand spaced apart from an associated computer system component including a processor;

placing an alternating current adapter within the monitor stand;

conductively coupling an output of the alternating current adapter to the at least one electronic component;

providing alternating current to the alternating current adapter;

converting the alternating current into direct current with the alternating current adapter; and providing the direct current to the at least one electronic component.

17. The method of claim 16, further comprising the step of forming the monitor stand from extruded plastic.

18. The method of claim 16, further comprising the step of regulating voltage supplied to the at least one electronic component with the alternating current adapter.

19. The method of claim 16, wherein the step of providing alternating current to the alternating current adapter comprises plugging the alternating current adapter into a wall outlet.

20. The method of claim 16, further comprising the step of placing a metallic shielding element on the alternating current adapter to shield the at least one electronic component from heat created by the alternating current adapter.

* * * * *